United States Patent
Blinn et al.

(10) Patent No.: US 8,032,632 B2
(45) Date of Patent: Oct. 4, 2011

(54) VALIDATING CHANGE OF NAME SERVER

(75) Inventors: Arnold N. Blinn, Bellevue, WA (US);
Donald M. Gillett, Bellevue, WA (US);
Stuart James Dent, Redmond, WA
(US); Srivaths B. Copparam, Issaquah,
WA (US)

(73) Assignee: Microsoft Corporation, Redmond, WA (US)

( * ) Notice: Subject to any disclaimer, the term of this patent is extended or adjusted under 35 U.S.C. 154(b) by 995 days.

(21) Appl. No.: 11/893,034

(22) Filed: Aug. 14, 2007

(65) Prior Publication Data
US 2009/0049198 A1  Feb. 19, 2009

(51) Int. Cl.
*G06F 15/173* (2006.01)
*G06F 15/16* (2006.01)

(52) U.S. Cl. .......................................... 709/225; 726/4
(58) Field of Classification Search .................. 709/245, 709/225; 726/4
See application file for complete search history.

(56) References Cited

U.S. PATENT DOCUMENTS

| | | | |
|---|---|---|---|
| 6,826,690 | B1 | 11/2004 | Hind et al. |
| 6,907,525 | B2 | 6/2005 | Pazi et al. |
| 6,961,783 | B1 | 11/2005 | Cook et al. |
| 2004/0230446 | A1 | 11/2004 | Park et al. |
| 2004/0246948 | A1* | 12/2004 | Lee et al. ................... 370/352 |
| 2005/0021841 | A1 | 1/2005 | Yoshimoto |
| 2005/0267968 | A1 | 12/2005 | Fearing et al. |
| 2006/0059337 | A1 | 3/2006 | Poyhonen et al. |
| 2006/0143442 | A1 | 6/2006 | Smith |
| 2006/0230039 | A1 | 10/2006 | Shull et al. |
| 2007/0067396 | A1 | 3/2007 | Blinn et al. |
| 2007/0067465 | A1* | 3/2007 | Blinn et al. ................ 709/229 |

OTHER PUBLICATIONS

"The DNS-LU Registry System", Date: Mar. 29, 2007, Version: 2.0.6, http://epp-test.dns.lu/DocRegistrar-2.0.6.pdf.
Klein, Amit, "Domain Contamination", Date: Jan. 31, 2006, Version: 0.6, http://www.webappsec.org/projects/articles/020606.shtml.

* cited by examiner

Primary Examiner — Larry Donaghue

(57) ABSTRACT

A Domain Name System (DNS) service provider may be engaged to host DNS service for a domain. Before providing service for a domain, the service provider may wish to verify that the entity that set up the service is the owner, or authorized controller, of the domain. The service provider gives the entity some information, such as a particular pair of name servers, and instructs the entity to have the domain registrar put the information into the name server (NS) record(s) for the domain. The service provider then queries NS for the domain and compares the NS record(s) returned with the information provided to the entity. If the NS records match the information given to the entity, then the service provider concludes that the entity has control over the domain, and uses the DNS records provided by the entity to provide service.

18 Claims, 5 Drawing Sheets

VALIDATING CHANGE OF NAME SERVER

BACKGROUND

The Domain Name System (DNS) provides name resolution services for Internet addresses. The various services associated with a domain—e.g., web hosting, mail, instant messaging, etc.—can be provided by different hosts, and DNS may be used to identify the hosts that provide these services. For any domain (e.g., a domain named "example.com"), DNS may associate, with the domain name, records such as an "A" record that identifies the domain's web site host, an "MX" record that identifies the domain's mail host, etc.

In DNS, name resolution itself is treated as a service. An "NS" record identifies the host(s) (or "name server(s)") that will provide name resolution for that domain. (Providing such name resolution services for a domain may be referred to as DNS hosting.) Domain registrars normally provide DNS hosting services, and when a domain is registered with a particular registrar, the registrar normally points the name server ("NS") records for that domain at its own DNS hosts. However, there are third-party DNS hosting services, and some domain owners may wish to re-delegate DNS hosting for their domain to a third-party service.

Any entity can contact a DNS provider and set up DNS records for any domain. An entity can set up DNS records even for a domain that the entity does not own or legitimately control. The situation in which an entity has set up DNS records for a domain that the entity does not own or control is benign, since the DNS records created with the new provider do not control name resolution for the domain until the NS records for the domain point at the new provider's name servers. However, if two or more entities assert control over the same domain and create sets of DNS records for that same domain, the DNS provider may wish to use some mechanism to resolve which entity is actually in control of the domain, and thus which set of DNS records to use for the domain once the NS records are pointing to that provider.

One way of addressing the situation where two or more entities set up DNS records for the same domain is to employ a rule such as the last entity to register for DNS service wins control of the domain. If this approach is used, then a "hacker" could insert itself as an owner by setting up DNS records with the DNS provider after the true owner sets up DNS records but before the true owner has pointed the NS records at the new provider, thereby allowing the hacker to take control of the domain. Another option is to block entities from setting up DNS service for a domain after one entity has set up DNS service. If this approach is used, then a hacker could set up DNS service for arbitrary domains and thereby cause a later party, such as the true owner, to be blocked from setting up DNS service with the DNS provider.

SUMMARY

An entity, such as a domain owner, may engage a DNS service provider to provide name resolution service for a domain. When the entity sets up DNS records for the domain, the service provider may give the entity information to be put into authoritative NS record(s) for the domain. For example, the service provider may provide DNS hosting service through several name servers, and the service provider may give the entity the names a pair of these servers with instructions to have the NS records for the domain pointed at that pair of servers. If plural entities attempt to set up DNS service for the same domain, then different information may be given out to each entity—e.g., a different pair of name server may be given to each entity that sets up DNS service.

When the entity receives the pair of name servers from the service provider, the entity contacts the registrar for the domain and has the registrar point the NS records for the domain at the specified pair of name servers. The service provider queries DNS to obtain the NS record(s) for the domain. The service provider can then check whether the NS record(s) have been set to the proper value(s). If more than one entity has asserted ownership over the domain and set up DNS records for that domain, then each of these entities has been given different information (e.g., a different pair of name servers). Since the entity in control of the domain can set the NS records for that domain to the values given to it by the service provider, by comparing the NS record(s) returned in response to the query with that values given to different entities asserting ownership it is possible to determine which entity is the true owner or controller of the domain, and therefore which set of DNS records to use.

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

DETAILED DESCRIPTION

Figure 1:
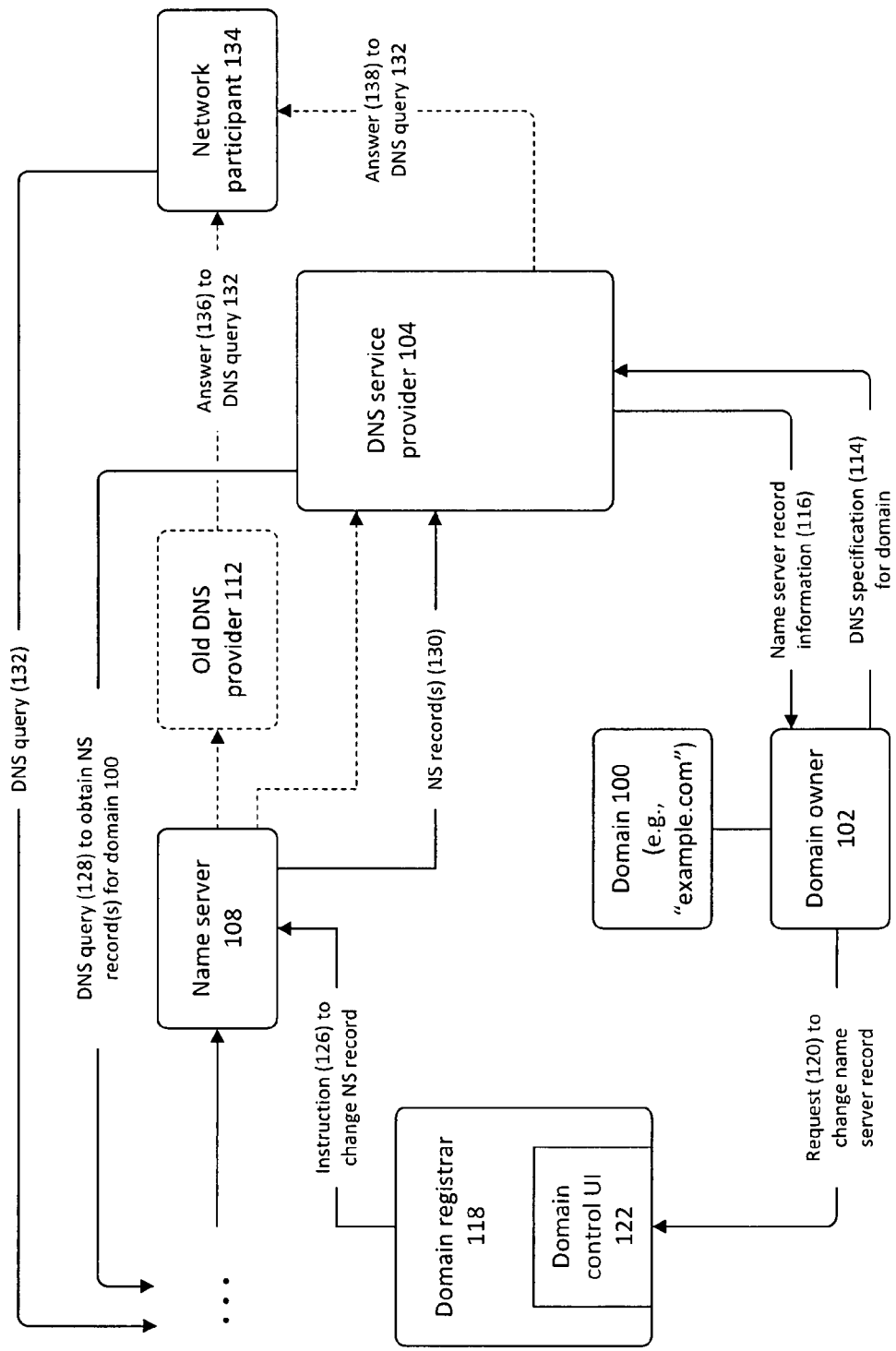
FIG. 1 is a block diagram of an example scenario in which a domain owner engages a service provider for that domain.

When a third-party provider is engaged to provide Domain Name System (DNS) services for a domain, the provider may want to determine that the entity that is engaging the service actually owns, or is otherwise in control of, the domain. The provider can give the entity information that the entity, in turn, may provide to the domain registrar for insertion into the domain's name server (NS) record(s). The entity's control over the domain may be inferable from the fact that the entity has caused the registrar to insert the specified information into the NS record(s). In some cases, two or more entities may attempt to set up DNS service for the same domain, and each entity can be given different information to put into the NS record(s) for the domain. By querying DNS to obtain the authoritative NS record(s) associated with the domain, and comparing the NS record(s) returned with the information given out to different entities, it is possible to determine which entity is the legitimate owner or controller of the domain, and therefore which entity's DNS records to use.

As a general matter, DNS is used to translate names into numeric addresses. A domain (e.g., "example.com") may be associated with one or more services, such as web hosting, mail, instant messaging, etc., and these services may be provided by particular servers, or hosts. A name server may be associated with a domain, and the name server maintains one or more DNS records that identify where the various services for the domain are provided. For example, the A record for a domain specifies the server (using an Internet Protocol ("IP") address or a name, such as "207.46.197.32" or "webhost33.example.net") where the domain's web site is hosted. As another example, the MX record(s) identifies the server(s) to which mail addressed to the domain (e.g., mail to "user@example.com") should be delivered.

DNS resolution for a domain is treated by DNS as a type of service. A domain may be associated with one or more NS records, which identify the server(s) that host DNS for the domain, and that respond to name resolution queries for that domain. (Name servers for DNS are given out in pairs, so typically there are two or four NS records for a domain. It is possible that DNS could be modified, or evolve, such that a different number of name servers, such as one or three, could be used.) For example, the domain "example.com" may be associated with one or more NS records that identify the name servers where the A record, the MX record, etc., for that domain can be found. The name server for a particular domain may be found through a top-down process: To resolve the name "example.com", a node in the network issues a query that is either initially directed at, or referred to, a name server that is authoritative for the ".com" top-level domain ("TLD"). One or more of these NS records identify the name server(s) where DNS service for the "example.com" domain is hosted. For example, the TLD name servers for ".com" may have NS records that point to ns1.example.net and ns2.example.net as the name servers for the "example.com" domain. The query is referred to one of these name servers (e.g., to ns1.example.net), which maintains the various DNS records (A, MX, etc.) for the domain "example.com".

The domain name is obtained through a registrar. A registrar for a particular TLD (such as a registrar for the ".com" TLD) can add or modify records in the TLD's name servers. GoDaddy, and Network Solutions are examples of domain registrars. These registrars are able to create domains ending with ".com", a process that involves adding an NS record for the domain to the name server(s) for the ".com" TLD.

Many registrars provide name servers for the domains they register. When a domain is created, the registrar typically points the NS records to its own name server(s). However, a domain owner may choose to have an entity different from the registrar act as the name server for that domain. There are various third-party DNS service providers, such as DynDNS, Nettica, etc. A domain owner (or other entity that controls a domain) can choose to have one of these service providers act as the DNS host in place of the registrar's name server(s). Third party DNS providers may allow an entity to create a DNS record for any domain. There is some risk that an entity will create DNS records for a domain that the party does not own, or that more than one entity will set up DNS records for the same domain, but such DNS records are benign until the authoritative NS record(s) for the domain point to the new DNS host's name servers. (Until the authoritative NS record(s) for the domain have been pointed at the new DNS provider's name servers, the DNS records that have been set up are not used to resolve names in the domain.) When the NS records have been pointed at the new DNS provider's name servers, that DNS provider may wish to determine which of the various entities that have set up DNS server for the domain is the true domain owner, so that the records provided by that entity can be used.

A DNS provider may provide the DNS service through a plurality of servers with different names and/or IP addresses. When an entity sets up a DNS record for a domain and asserts control over the domain, the DNS service provider may give the identity of one of these servers, or a combination of these servers, and instruct the entity to have the registrar point the NS record(s) for the domain at the identified server(s). The DNS provider can then query what the NS for the domain points to. By comparing the name server(s) given to the entity with the NS record(s) servers obtained from the DNS query, the DNS provider can determine which entity has control over the domain. If each entity that set up DNS for the domain is given different information (e.g., a different pair of name servers), then the NS record(s) returned for the domain will indicate which entity has control for the domain, since that entity has demonstrated that it was able to change the NS for the domain.

FIG. 1 shows an example scenario in which a domain owner 102 engages a DNS service provider 104 to act as the DNS host for a particular domain. DNS service provider 104 is a mechanism that provides name resolution and/or other DNS services for a domain.

For example, domain owner 102 may be the registrant of a domain 100 (named "example.com"). Domain 100's present DNS provider is labeled "old DNS provider" 112, and domain owner 102 may wish to engage a new DNS provider (DNS service provider 104) to provide DNS service for domain 100. FIG. 1 shows a domain "owner", although control over domain 100 may be exerted by an entity other than the domain's legal owner (e.g., domain 100 may be licensed to the controlling entity, registered to an anonymous proxy on behalf of the controlling entity, etc.).

Name server 108 is a name server for the ".com" TLD. It contains NS records that identify the name server(s) where DNS for various domains within the ".com" TLD are hosted. When a DNS query (e.g., query 132) relating to a domain in the ".com" TLD (e.g., "example.com") is to be resolved, name server 108 may be used as part of the process of handling the query, by referring the query to the DNS host as identified in the domain's NS record(s). (In the process of handling the query, name server 108 may be reached, for example, through a chain of referrals, as indicated in FIG. 1 by an ellipsis. For example, there may be a root name server that refers queries to different TLD name servers depending on the TLD of the domain in question—e.g., queries for domains ending with ".com" may be referred to one TLD name server, and queries ending with ".uk" may be referred to a different TLD name server, etc.) Name server 108 has an NS record pointing to a name server that presently acts as a DNS host for the domain 100 ("old" DNS service provider 112), and thus query 132 is referred to a name server operated by "old" DNS service provider 112 for resolution. Thus, if network participant 134 is attempting to find the MX record for domain 100, then query 132 is referred to a name server operated by "old" DNS service provider 112, which returns an answer 136 to query 132 (e.g., an answer containing the MX record). If the DNS service provider for domain 100 had been changed to DNS service provider 104, then query 132 would have been referred to a name server operated by DNS service provider 104, which would return answer 138 to query 132. (The dashed lines leading from name server 108 to "old" DNS provider 112 and DNS service provider 104 show the different referrals that would be made for a query, depending on which of these DNS providers the NS records for domain 100 point to.)

At some point, domain owner 102 engages DNS service provider 104 to become the new DNS provider for domain 100. As part of the engagement process, domain owner 102 may provide a DNS specification 114 for the domain. Specification 114 may include A records, MX records, etc., or a set of rules as to how names in domain 100 are to be resolved. The engagement process may also include actions such as creating an account with DNS service provider 104, making payment for hosting the DNS service, etc.

When DNS service provider 104 is to be engaged as a DNS host for domain 100, DNS service provider 104 provides name server record information 116 to domain owner 102. Name server record information 116 is information to be inserted into the NS records of "example.com" at a name server that is authoritative for the ".com" zone. As previously noted, a registrar for a particular TLD (such as domain registrar 118) is able to add or modify NS records at the name servers for that TLD (such changes being made at name server 108). Registrars can change the NS records as the request of the registrant, so domain owner 102 may take the name server record information 116 and ask domain registrar 118 to add or change the NS records at the ".com" TLD name servers (including, for example, name server 108) to reflect the name server record information 116 that has been given to domain owner 102 by DNS service provider 104.

Name server record information 116 may, for example, be the identity or identities of one or more name servers (e.g., servers operated by DNS service provider 104) that DNS service provider 104 will use to provide DNS service for domain 100. (The TLD name server(s), and the name server(s) operated by the DNS provider, are both examples of name servers. The TLD name server resolves the address of the name server(s) for sub-domains in the ".com" domain (e.g., example.com). The name server records at the TLD point to the name servers that a DNS provider (e.g., DNS provider 104) hosts, which contain A records, MX records, etc., for the domain, although it is also possible that the name servers at DNS provider 104 contain NS records too, such as NS records pointing the name servers that host DNS for sub-domains of example.com, such as "a.example.com".) In one example, DNS service provider 104 operates a plurality of servers, and name server record information 116 includes the identities of a pair of servers at which the NS records for domain 100 are to be pointed. The various servers operated by DNS service provider 104 may mirror or overlap as to their functionality or as to the records that they store, and it may be the case that any one of the plurality of servers would have the ability to respond to a name query for a given domain. However, the particular pair of name servers that is given out can act as a code to identify the actual owner (or entity in control) of the domain: When the entity asserting control of the domain demonstrates that it was able to put a particular pair of name servers into the NS records at the request of DNS service provider 104, that fact may demonstrate, to DNS service provider 104, that domain owner 102 does indeed have control over domain 100. It should be noted that a pair of name servers is merely one example of the type of information that may be contained in name server record information 116. Other examples include a different number of server identities (e.g., three, four, etc.), a single server identity, or some other type of information. The established format of DNS records may govern the type of information that can be inserted into an NS record, or the number of name servers to be used for a domain. (At the time of this filing, name servers in DNS are assigned for a domain in pairs to provide redundancy, but it is possible that other name resolution mechanism could exist that allow a domain to have a single name server.) As long as name server record information 116 is of a type that can be included in an NS record, DNS service provider can request that domain owner 102 put that information into the NS record, and may infer domain owner 102's control over domain 100 from the fact that domain owner 102 was able to do so.

After name server record information 116 has been provided to domain owner 102, domain owner 102 makes a request 120 that domain registrar 118 change NS records for domain 100 so that the values of these records will reflect name server record information 116. Request 120 can be made in various ways, such as through a web site provided by domain registrar 118, by sending a fax or letter to domain registrar 118, etc. In one example, domain registrar 118 operates a web site that implements a domain control user interface 122, through which a user can perform administrative acts for a domain, such as requesting a change to the domain's name server. Some registrars may receive these requests in different ways, such as by letter, fax, etc.

After domain owner 102 makes request 120 to change the name server record(s) for a domain, domain registrar 118 gives an instruction 126 to the applicable name server(s) (e.g., name server 108) to change the NS record(s) for the domain to reflect information 116. The name server(s) make the change in accordance with this instruction.

It may be the case that more than one entity has set up DNS records for domain 100. DNS service provider 104 may attempt to determine which of these entities has control over the domain in order to determine which DNS records to use. Service provider 104 may assess which entity has control by issuing a DNS query 128 to find the NS record(s) for domain 100. In the example of FIG. 1, name server 108 (which is one of the TLD name servers for the ".com" domain) holds such NS record(s) 130, and returns the record(s) to DNS service provider 104. DNS service provider 104 then compares the NS record(s) 130 that it has received against the information 116 that was provided to domain owner 102. Based on the comparison, DNS service provider 104 may conclude that domain owner 102 has control of domain 100, or that some other entity that has set up DNS records with service provider 104 is in control of domain 100, or that no entity known to service provider 104 controls domain 100. Based on the result of this comparison, DNS service provider determine which (if any) of the various entities that have set up DNS service for domain 100 has control of the domain, and, therefore, which set of DNS records to use to respond to queries for the domain.

As one example, DNS service provider 104 may operate a plurality of name servers (e.g., twelve servers, named ns1.example.net through ns12.example.net, or some number of names that map to a smaller number of physical name servers), and may provide different pairs of name servers to the different entities that create DNS records for domain 100. Thus, DNS service provider may give a first entity the pair of name servers "ns3.example.net" and "ns5.example.net", and a second entity the pair "ns4.example.net" and "ns10.example.net". If, upon querying the name of domain 100, the NS records that are returned are "ns3.example.net" and "ns5.example.net", then DNS service provider may conclude that the first entity is in control of the domain, since that entity has demonstrated it was able to set the domain's NS records to the particular pair of name servers that was given to that entity. Thus, if the first and second entities each created DNS records for domain 100, DNS service provider 104 may choose to provide DNS service based on the first entity's records. (In the case where there is some number of name server names that maps to a smaller number of physical name servers, the different names may be used as a way to check whether the entity was able to change the NS records to the same name, while the two physical name servers are the mechanisms that are actually used to host DNS for domain 100.)

It should be noted that it is possible for the number of entities that attempt to create DNS records for a domain to exceed the number of distinct pieces of name server information that can be provided to those entities. For example, if there are twelve name servers and the information given, to each entity is a selected pair of name servers, then there is a limit as to how many different pairs exist. In one example, there are twelve name servers names that map to two physical name servers (e.g., name servers names 1-6 map to a first name server and name servers 7-12 map to a second name server). To maintain redundancy, one of the names can be chosen from the first group (1-6) and the other name can be chosen from the second group (7-12), in which case the total number of distinct name server pairs is 36. (Of course, this arrangement can be performed with different numbers of names and name servers—e.g., there could be fifteen names, where names 1-3 map to a first name server and names 4-15 map to a second name server.) In the case where there are 36 different pairs that can be given, and these 36 different pairs have already been given out to 36 different entities that have tried to set up DNS service for domain 100, then no new pair will be available to give out to a $37^{th}$ entity that attempts to set up DNS service for that same domain. In this case, determining whether an entity has control over a domain can be done in other ways—e.g., by having a customer service agent call the entity and perform some other type of verification, by voiding all DNS records that have been provided and having the entities start over, etc.

It should be noted that FIG. 1 is described herein in terms of a DNS service provider. However, the techniques discussed in connection with FIG. 1 could be used by a provider of any type of service.

Figure 2:
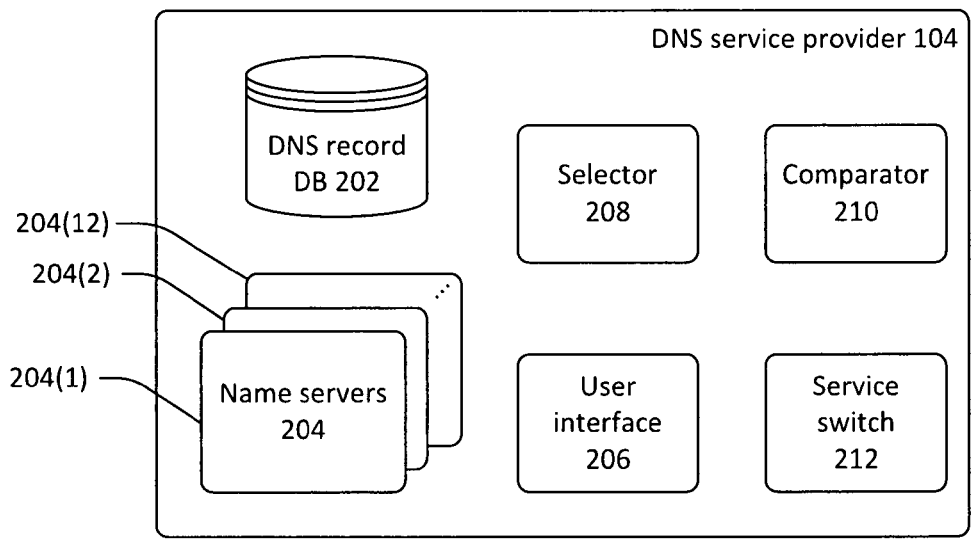
FIG. 2 is a block diagram of example components that may be used in connection with a service provider.

FIG. 2 shows example components that may be included in, or used by, DNS service provider 104.

DNS record database 202 stores DNS records created by entities. When an entity (e.g., domain owner 102, shown in FIG. 1) specifies DNS records for a domain, the records may be stored in DNS record database 202.

Name servers 204 are servers that respond to DNS queries for a domain. Name servers 204 may provide responses based on the records in DNS record database 202. Name servers 204 may comprise a plurality of servers. In the example of FIG. 2, twelve servers 204(1), 204(2), . . . , 204(12) are shown. (The twelve servers can be different physical name servers, but could also be twelve names that map to some smaller number of physical name servers as discussed above.) The different servers may have different names, such as ns1.example.net, ns2.example.net, and so forth. Name servers 204 normally mirror each other's functionality—e.g., it may be the case that name servers 204(1) through 204(12) can each respond to the same set of DNS requests. However, name servers 204 may also have functionalities that differ from each other's—e.g., it may be the case that DNS service for a given domain is provided by a proper subset of name servers 204.

User interface 206 is a component through which DNS service provider 104 communicates with users. For example, user interface 206 may comprise a web site, through which users may register, specify DNS information for domains, pay for service, etc. The DNS specification 114 for a domain (shown in FIG. 1) may be received through user interface 206, and the name server record information 116 (also shown in FIG. 1) may be provided through user interface 206.

Selector 208 is a component that selects one or more name servers to be provided to entities that attempt to engage DNS service provider 104. As noted above, one type of information 116 (shown in FIG. 1) that may be provided to a domain owner is the identities of one or more name servers that are to be inserted into a domain's NS record(s). Selector 208 selects the name server(s) to be provided to the domain owner—e.g., by selecting one or more name servers from among name server(s) 204. As previously noted, in one example a pair of name servers may be provided to the domain owner, in which case selector 208 may select two of the name servers 204.

Comparator 210 compares the name server information provided to a particular entity with NS records received in response to a DNS query for the domain. As noted above, a purported domain owner demonstrates control over a domain by having the domain registrar put the information given to the entity into the NS records for the domain. Comparator 210 may be used to compare the information given to the entity with the NS record(s) that is received when NS is queried for the domain. Comparator 210 may compare the information given and the NS record(s) received based on various types of criteria. For example, comparator 210 may determine whether the given information matches what is in the NS records, or may determine whether the given information is included in the NS records, etc. Also, in making the comparison, comparator 210 may treat order among the records as significant, or not significant.

Service switch 212 controls which, of the various sets of DNS records that have been provided for a domain, will control name resolution for that domain when responding to DNS queries. As noted above, DNS service provider 104 may receive specifications of DNS records for a domain from a plurality of entities, and may want to determine which entity controls the domain in order to determine which set of DNS records will be used for the domain. Service switch 212 causes DNS service provider 104 to use a particular one of the sets of records, depending on which of the entities has demonstrated control of the domain. Service switch 212 may receive the result of a comparison performed by comparator 210, and may cause a particular set of DNS records to be used based on a result from comparator 210.

It should be noted that the various components shown in FIG. 2 may take various forms. For example, each component may be implemented as a software function or as a software object. However, the various different functionalities discussed above in connection with FIG. 2 need not be separated into different functions or objects; a particular line of code, a portion of a line of code, etc., can be considered to be a component.

Figure 3:
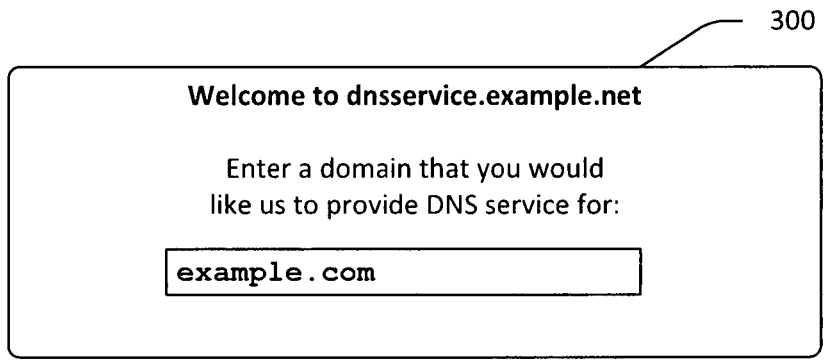
FIGS. 3 and 4 are block diagrams of example dialogs between a domain owner and a service provider.
Figure 4:
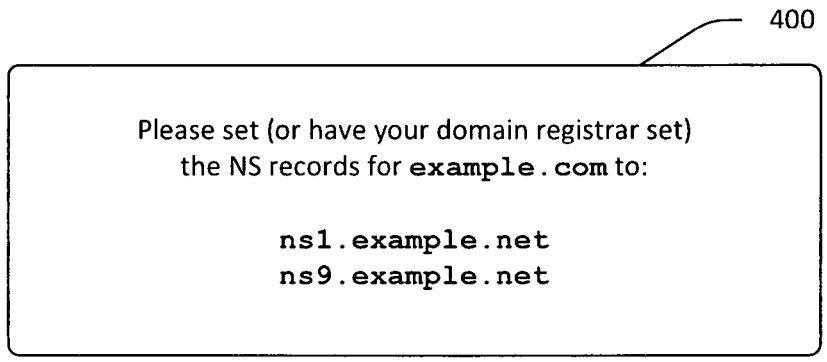

FIGS. 3 and 4 show example dialog boxes 300 and 400 that a DNS service provider 104 may use to communicate with an entity that wishes to engage DNS service provider 104 as the DNS host for a domain. Dialog boxes 300 and 400 may be part of user interface 206 (shown in FIG. 2).

In dialog box 300, DNS service provider 104 (which is named "dnsservice.example.net", in the example of FIG. 3), asks a user or other entity to enter the name of a domain for which DNS service provider 104 is to host DNS service. The user enters the domain name "example.com" into the space provided. After DNS service provider 104 receives the domain name, it may allow the user to specify DNS records for that domain—e.g., A records, MX records, etc. At some point, DNS service provider 104 provides the user with information to be included in the NS record(s) for the domain. Dialog box 400 shows an example of providing this information. Dialog box 400 asks the user to set (or have the user's domain registrar set) the NS records for example.com to a specific pair of name servers.

Figure 5:
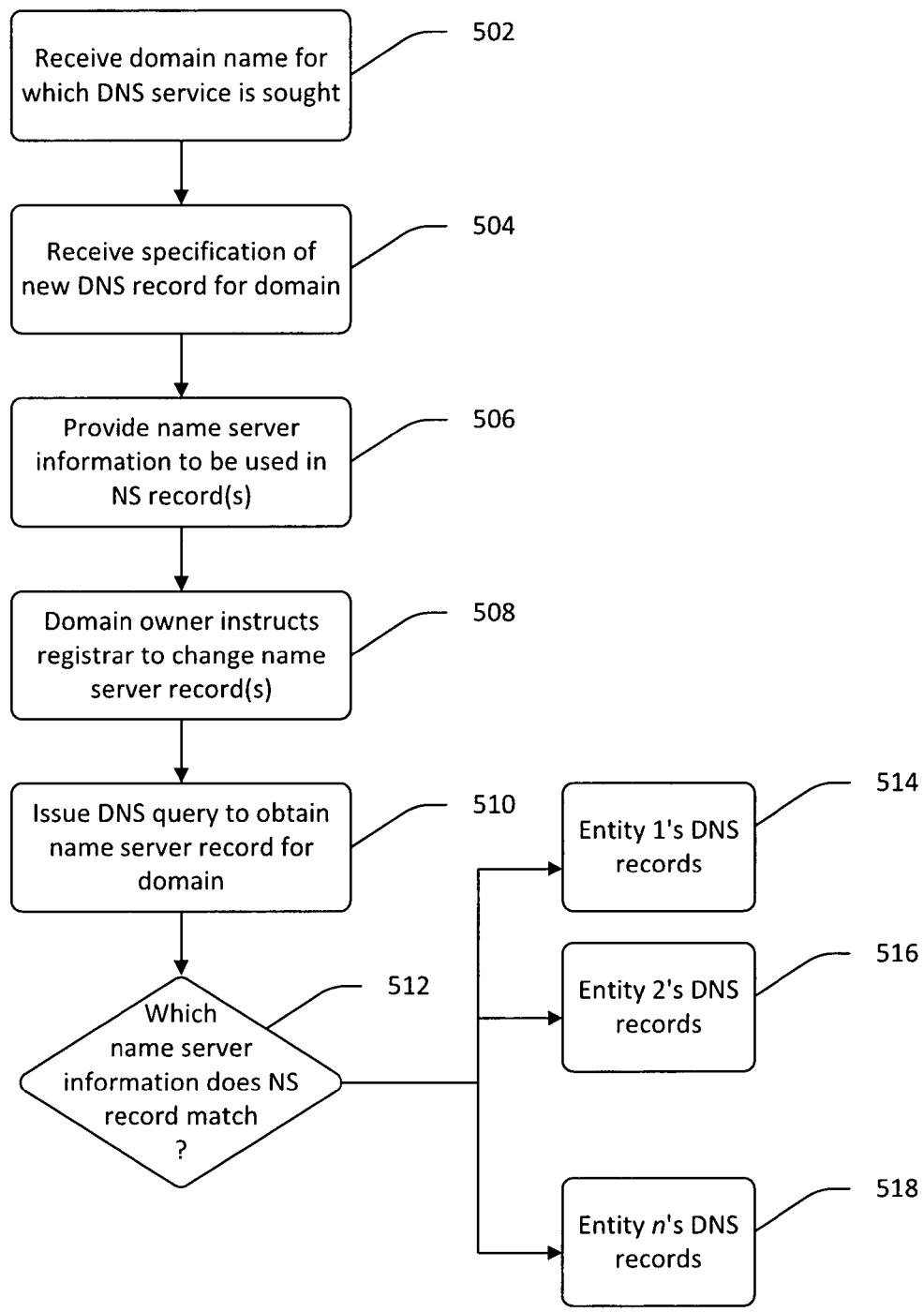
FIGS. 5 and 6 are flow diagrams of example processes that may be performed by a service provider.
Figure 6:
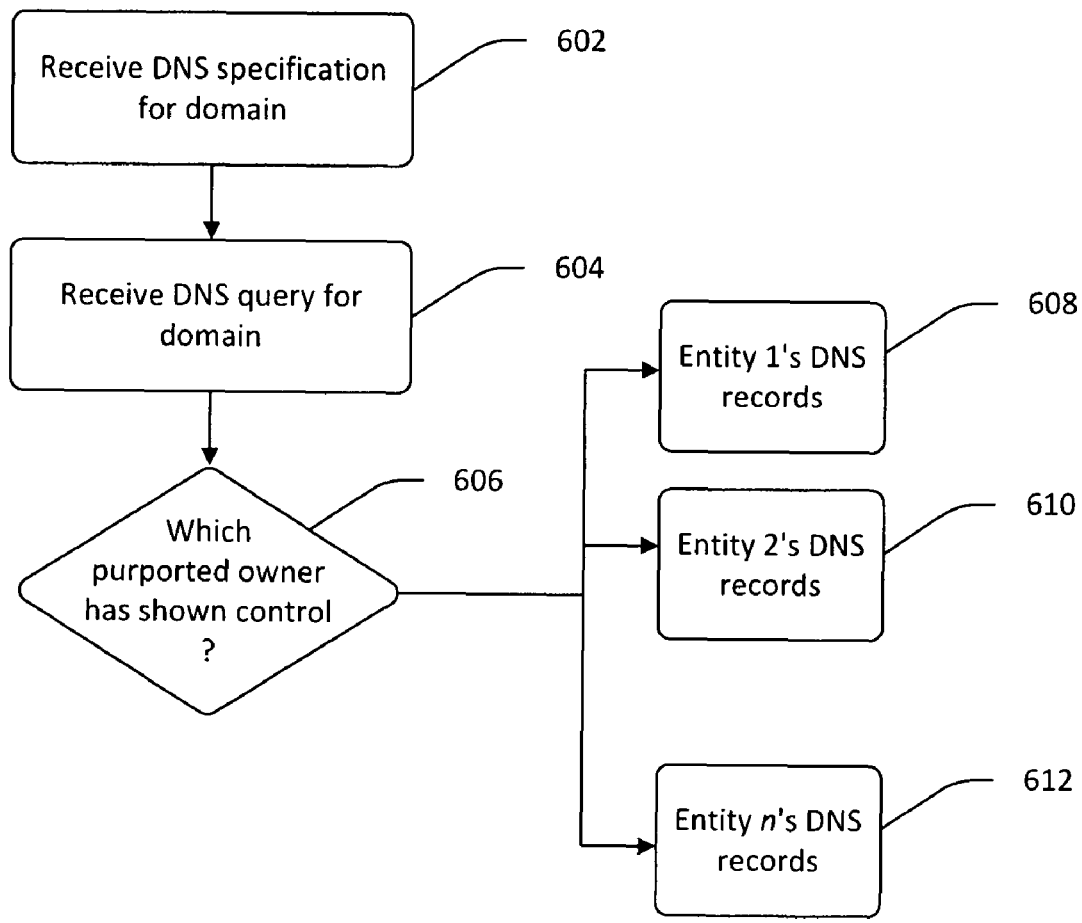

FIGS. 5 and 6 are flow diagrams of example processes that may be carried out by a service provider. It should be noted that the various stages of these processes shown in the blocks of FIGS. 5 and 6 may be performed in the order shown, but alternatively may be performed in a different order, or in various combinations or sub-combinations. Additionally, these stages may be performed in systems, scenarios, or environments depicted herein (e.g., in the scenario shown in FIG. 1), but also may be performed in any other system, scenario, or environment.

Referring to FIG. 5, at 502 the DNS service provider receives the name of a domain for which a domain owner (or other entity) is seeking DNS service. The domain owner, or other entity, may also provide specifications of DNS records for that domain, and these specifications are received at 504. At 506, the DNS service provider provides the name server information to be included in, or otherwise reflected in, the NS records for the domain. For example, the DNS service provider may provide the names of a pair of name servers. 502, 504, and 506 may be performed plural times, with respect to various different entities, if these different entities are attempting to set up DNS service for a particular domain.

At 508, the domain owner, or other entity, instructs the registrar for the domain to change (or to have changed) the name server (NS) record(s) for the domain to reflect the information provided. In general, the domain owner (or other entity in legitimate control of the domain) would be able to cause the registrar to make this change, while other entities (e.g., parties other than the domain owner that have attempted to set up DNS service for a particular domain) would not be able to cause the registrar to make this change.

At 510, the DNS service provider issues a DNS query to obtain the NS record(s) for the domain for which service has been sought. At 512, it is determined which (if any) of the name server information given out the various entities that have set up DNS service correspond to the NS record(s) that were obtained at 510. The DNS service provider then uses the proper entity's DNS records to provide DNS service for the domain (e.g., by responding to DNS queries based on the DNS records specified by entity 1 (514), entity 2 (516), . . . entity n (518)). If the NS records returned at 510 do not correspond to the name server information given out to any of the entities that have set up DNS service for the domain, then DNS service on behalf of the domain is not provided.

FIG. 6 shows another example process that may be performed by a DNS service provider. At 602, an entity that purports to own, or otherwise control, a domain specifies DNS records for that domain, and a specification of these records are received by the DNS service provider. 602 may be performed plural times, with respect to various different entities that are attempting to set up DNS service for a domain. At some point, a DNS query relating to the domain is received (at 604). It is then determined (at 606) which (if any) of the various entities that have attempted to set up DNS service for the domain is in control of the domain. (Control can be shown, for example, by changing the NS records for the domain to the values that the DNS service provider has instructed the entity to put in the NS records.) The query received at 604 is then responded to, based on the DNS records specified by the entity (if any) that has demonstrated control over the domain (e.g., by using DNS records specified by entity 1 (608), entity 2 (610), . . . entity n (612)).

Figure 7:
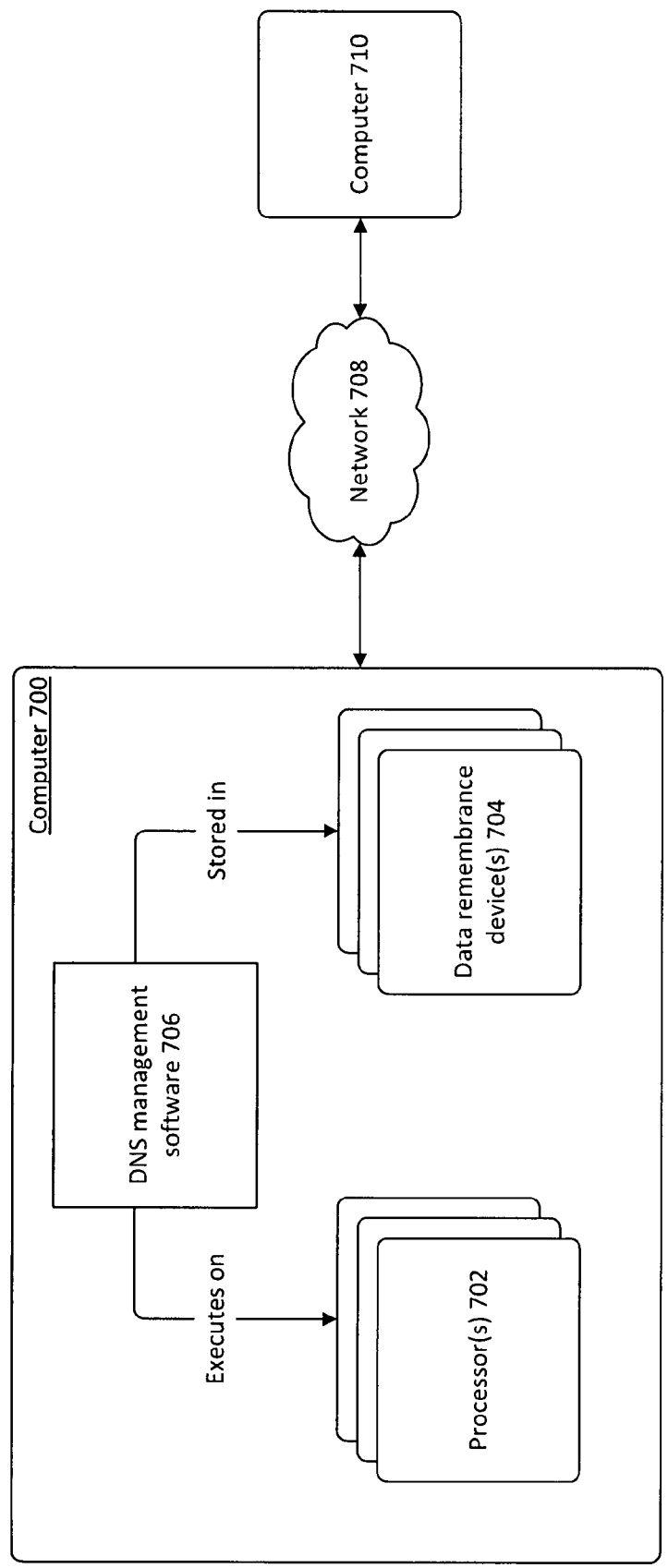
FIG. 7 is a block diagram of an example scenario in which in which aspects of the subject matter described herein may be deployed.

FIG. 7 shows an example environment in which aspects of the subject matter described herein may be deployed.

Computer 700 includes one or more processors 702 and one or more data remembrance devices 704. Processor(s) 702 are typically microprocessors, such as those found in a personal desktop or laptop computer, a server, or a handheld computer. Data remembrance device(s) 704 are devices that are capable of storing data for either the short or long term. Examples of data remembrance device(s) 704 include hard disks, removable disks (including optical and magnetic disks), volatile and non-volatile random-access memory (RAM), all types of read-only memory (ROM), flash memory, magnetic tape, etc. Data remembrance device(s) are examples of computer-readable storage media.

Software may be stored in the data remembrance device(s) 704, and may execute on the one or more processor(s) 702. An example of such software is DNS management software 706, which may implement some or all of the functionality described above in connection with FIGS. 1-6. A personal computer in which a program is stored on hard disk, loaded into RAM, and executed on the computer's processor(s) typifies the scenario depicted in FIG. 7, although the subject matter described herein is not limited to this example.

The subject matter described herein can be implemented as software that is stored in one or more of the data remembrance device(s) 704 and that executes on one or more of the processor(s) 702. As another example, the subject matter can be implemented as software having instructions to perform one or more acts, where the instructions are stored on one or more computer-readable media.

In a typical environment, computer 700 may be communicatively connected to one or more other devices through network 706. Computer 710, which may be similar in structure to computer 700, is an example of a device that can be connected to computer 700, although other types of devices may also be so connected.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

The invention claimed is:

1. A method of managing a service, the method comprising:
    using a processor to perform acts comprising:
        receiving, from an entity, a request to provide the service for a domain;
        selecting one or more name server identities from identities associated with a group of servers that provide the service;
        communicating one or more data to said entity, wherein said one or more data comprise a set of said one or more name server identities;
        obtaining, from a published name record, one or more name server values associated with said domain;
        comparing said one or more data with said one or more name server values by assessing whether said set matches said one or more name server values;
        determining, based on said comparing, that the service is to be provided for said domain, where the service is based on a specification provided by said entity; and
        after said determining, using servers associated with said one or more name server identities to provide the service.

2. The method of claim 1, wherein the service comprises a Domain Name System (DNS) hosting service.

3. The method of claim 1, wherein said specification comprises a Domain Name System (DNS) record for said domain, and wherein said acts further comprise:
    receiving said specification prior to said determining.

4. The method of claim 3, wherein said acts further comprise:
- receiving a DNS query relating to said domain after said receiving of said specification and prior to said determining; and
- declining to provide said Domain Name System (DNS) record in response to said query.

5. The method of claim 1, wherein there is a number of distinct instances of said one or more data, and wherein said acts further comprise:
- receiving said number of requests to provide the service for said domain;
- communicating a different one of said instances in response to each of said requests;
- receiving an additional request to provide the service for said domain; and
- referring a determination as to whether the service can be provided for said domain to a person for resolution.

6. The method of claim 1, wherein the service comprises a Domain Name System (DNS) hosting service, and wherein said acts further comprise:
- receiving a plurality of requests to provide the service for said domain;
- providing, in response to each of the plurality of requests, a different pair of server identities from said group of servers to provide said DNS hosting service.

7. The method of claim 1, wherein the service comprises a Domain Name System (DNS) hosting service, wherein said acts further comprise:
- receiving a DNS query relating to said domain;
- finding that a name server record in a DNS record for said domain points to a pair of name servers that provide said DNS hosting service but that are not in the set of one or more name server identities communicated to said entity; and
- based on said finding, declining to respond to said DNS query.

8. A system that provides a service, the system comprising:
- one or more data remembrance devices;
- one or more processors;
- software that is stored in at least one of said data remembrance devices and that is executable on at least one of said processors, said software comprising:
  - a first component that selects a first set of one or more server identities to provide to a first entity;
  - a second component that receives a first request from said first entity to provide the service for a domain, and that provides said first set of one or more server identities to said first entity, said first request comprising a first specification that comprises a first Domain Name System (DNS) record for said domain;
  - a third component that issues a query to obtain, from a published name record, one or more name server values associated with said domain and that, based on a first comparison of said first set of one or more server identities with said one or more name server values, makes a determination of whether to use said first specification to provide the service, the system, based on said determination, either using or declining to use said first specification to provide the service,
- wherein the system provides said service through a plurality of servers, and wherein said first component selects said first set of one or more server identities from among the identities of said plurality of servers.

9. The system of claim 8, wherein said one or more server identities comprise identities of at least two servers.

10. The system of claim 8, wherein said comparison comprises an assessment as to whether said first set of one or more server identities match said one or more name server values.

11. The system of claim 10, wherein said comparison takes into account an order of said first set of one or more server identities and said one or more name server values.

12. The system of claim 8, wherein a second entity provides to said system a second specification that comprises a second Domain Name System (DNS) record for said domain, wherein said second component provides a second set of one or more server identities to said second entity, and wherein said third component determines, based on said first comparison and based on a second comparison of said second set of one or more server identities with said one or more name server values, whether to use said first specification or said second specification to provide the service.

13. One or more computer-readable storage media comprising executable instructions to perform a method comprising:
- receiving, from an entity, a specification of one or more Domain Name System (DNS) values for a domain and a request to provide a DNS hosting service that uses said specification;
- providing one or more server identities to said entity; and
- obtaining, from a published record associated with said domain, one or more name server values;
- receiving a first query relating to said domain;
- making a determination that said entity has demonstrated control over said domain by determining that said one or more name server values match said one or more server identities; and
- in response to said determination, communicating, over a network, at least one of said one or more DNS values in response to said first query,
- wherein the DNS hosting service is provided by one or more of a plurality of servers, and wherein said one or more server identities are selected from identities of said plurality of servers.

14. The system of claim 8, wherein the service comprises a DNS hosting service, wherein the third component receives a DNS query relating to said domain, makes a finding that a name server record in a DNS record for said domain points to a pair of name servers that provide said DNS hosting service but that are not in the set of one or more name server identities provided to said first entity, and, based on said finding, declines to respond to said DNS query.

15. The one or more computer-readable storage media of claim 13, wherein the method further comprises:
- receiving a second query before said making of said determination and after said receiving of said specification; and
- in response to said second query, declining to provide said DNS values.

16. The one or more computer-readable storage media of claim 13, wherein the method further comprises:
- providing one or more data to said entity;
- comparing said one or more data with a published record associated with said domain;
- determining that said comparing does not resolve whether said entity controls said domain; and
- referring an issue of control over said domain to a person.

17. The one or more computer-readable storage media of claim 13, wherein the method further comprises:
- receiving a second query, wherein said second query comprises a DNS query that relates to said domain;
- finding that a name server record in a DNS record for said domain points to a pair of name servers that provide said DNS hosting service but that are not in the set of one or more name server identities provided to said entity; and based on said finding, declining to respond to said second query.

18. The one or more computer-readable storage media of claim 13, wherein said acts further comprise:

receiving a plurality of requests to provide said DNS hosting service for said domain;

providing, in response to each of the plurality of requests, a different pair of server identities from said group of servers to provide said DNS hosting service.

* * * * *